INVENTORS
THOMAS E. PERRY
ROBERT H. HENKE
JOHN E. FOGARTY
JOHN A. RINEBOLT
RODERICK J. PLACE
SIDNEY W. POOLE

BY Ward, Haselton, McElhannon, Orme, Brooks + Fitzpatrick

ATTORNEYS

June 11, 1968  T. E. PERRY ET AL  3,387,967

HIGH PURITY STEELS AND PRODUCTION THEREOF

Filed Feb. 8, 1965  10 Sheets-Sheet 3

INVENTORS
THOMAS E. PERRY
ROBERT H. HENKE
JOHN E. FOGARTY
JOHN A. RINEBOLT
RODERICK J. PLACE
SIDNEY W. POOLE
BY
Ward, Haselton, McElhannon,
Orme, Brooks & Fitzpatrick
ATTORNEYS June 11, 1968  T. E. PERRY ETAL  3,387,967
HIGH PURITY STEELS AND PRODUCTION THEREOF
Filed Feb. 8, 1965  10 Sheets-Sheet 6

Fig.11.

INVENTORS
THOMAS E. PERRY
ROBERT H. HENKE
JOHN E. FOGARTY
JOHN A. RINEBOLT
RODERICK J. PLACE
SIDNEY W. POOLE
BY Ward, Haselton, McElhannon,
Orme, Brooks & Fitzpatrick
ATTORNEYS

Fig. 13

United States Patent Office 3,387,967
Patented June 11, 1968

3,387,967
HIGH PURITY STEELS AND PRODUCTION
THEREOF
Thomas E. Perry, North Canton, Ohio, Robert H. Henke, Richmond, Va., and John E. Fogarty and John A. Rinebolt, Canton, Roderick J. Place, Massillon, and Sidney W. Poole, Cleveland, Ohio, assignors to Republic Steel Corporation, Cleveland, Ohio, a corporation of New Jersey
Continuation-in-part of applications Ser. No. 203,091, June 18, 1962, and Ser. No. 332,218, Dec. 20, 1963. This application Feb. 8, 1965, Ser. No. 431,053
6 Claims. (Cl. 75—12)

This application is a continuation-in-part of copending applications Ser. No. 203,091, filed June 18, 1962, now Patent No. 3,288,589, and Ser. No. 332,218, now abandoned, filed Dec. 20, 1963.

This invention pertains to the production of high purity steels having low levels of gaseous constituents, such as hydrogen, oxygen and nitrogen, and which are also substantially free from solid oxide and other solid contaminating inclusions, as for example manganese sulfide, which solid inclusions are normally produced in steels by the use of metal deoxidizing agents, such as aluminum, silicon, manganese, etc. The invention further pertains to novel methods of producing such high purity steels and more particularly to martensitic alloy steels, and to the resulting steels themselves which are characterized by higher strength, ductility and toughness than steels produced by conventional techniques.

An understanding of the novel methods of the invention for producing such steels, is best obtained by first discussing the reasons for and significance of various of the steps involved, and then describing the overall methods employed. And since this procedure requires reference to the accompanying drawings as the description proceeds, the drawings will be identified at this stage. Referring thereto:

FIG. 6 is a partial, sectional elevation as taken at 6—6 of FIG. 5; while FIG. 7 is a further fragmentary portion of FIG. 5 as taken at 7—7 of FIG. 5.

FIG. 8 is a further fragmentary plan view of a portion of FIG. 6 as taken at 8—8 thereof.

Proceeding now to a description of the invention along the lines above indicated:

A conventional practice of steel deoxidation involves additions of strong metallic deoxidizers such as aluminum, silicon, manganese, etc., to the molten steel as air melted and tapped from the electric or open hearth furnace. The practical minimum level of deoxidation thus obtained with good metallic deoxidizers, such as above, is about 20 p.p.m. of oxygen. The deoxidation products are solid oxides, many of which remain in the steel as dirt and in large ingots tend to segregate during freezing.

As against this, carbon may be employed as a deoxidizing agent in accordance with the procedures and subject to the precautions of the present invention as discussed below, with the decided advantage over the metallic deoxidizers, that the deoxidation products are gaseous and hence are evolved from the molten steel bath.

Thus in an open hearth or electric furnace steel bath, there is a definite relationship between the carbon content and the oxygen content. At 2912° F. under normal atmospheric conditions, if the carbon content is 0.80%, the actual oxygen content normally ranges near 150 p.p.m.; similarly if the carbon is 0.20%, the oxygen is near 250 p.p.m. Therefore, there is a definite balance between oxygen and carbon contents. If the balance is disturbed by the addition of oxygen (as in ore, for example) a violent boil develops. Similarly, if carbon is added, a boil develops. In each case, the boil continues until a new balance (or equilibrium) between the carbon and oxygen contents is achieved. The boil that develops is caused by the evolution of carbon monoxide gas as a result of the following reaction:

$C+O \rightarrow CO$ gas

Therefore, carbon is a true deoxidizer and strongly deoxidizes the melt until the reaction achieves equilibrium as more fully discussed hereinafter. Unfortunately, at atmospheric pressure, equilibrium is reached with a higher concentration of oxygen than is desirable in many instances. As a result, strong deoxidizers such as silicon and aluminum are normally employed to achieve low oxygen contents. The disadvantage of the latter is that the products of deoxidation are silicate or aluminum oxide type inclusions which remain entrapped in the steel and impair its properties. The advantage of carbon deoxidation, if it could be made more effective, is that the product of deoxidation is not solid inclusions, but a gas (carbon monoxide) which completely leaves the system.

The question arises, "What can be done to improve the deoxidizing power of carbon?" Vacuum degassing is effective in this regard as shown by the following equation which illustrates the effect on the oxygen content of exposing molten steel to varying levels of pressure P in a degassing chamber.

(1) $\quad\quad\quad\quad\text{Percent } O_2 = P \times K$

Figure 1:
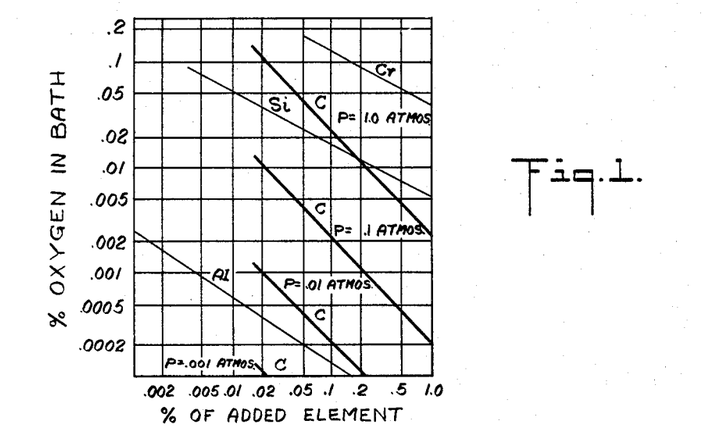
FIG. 1 is a graphical representation of the relative deoxidizing activity of various elements in a molten steel bath.

The value of K in the above equation varies with the carbon content and temperature of the iron bath, but is a constant for a given set of these conditions. Therefore, as the pressure P of the vacuum or degassing chamber is reduced from 1 atmosphere to 0.1 atm., 0.01 atm., or 0.001 atm., the oxygen content of the melt tends to be reduced accordingly 10, 100, and 1000 times. The excess oxygen boils off by the same reaction $C+O \rightarrow CO$ (gas) as occurred during the carbon boil in the furnace. In this case, however, the carbon-oxygen balance is not disturbed by the addition of ore, but rather by a change in the atmospheric pressure over the melt. The net effect has been to drive the equilibrium reaction to the right to increase the degree of deoxidation by the carbon. This is illustrated in FIG. 1 in the accompanying drawings, which compares the deoxidizing power at 2910° F. of aluminum, silicon and chromium with the theoretical deoxidizing power of carbon at various atmospheric pressure levels, wherein the percent of the deoxidizing agent is plotted as abscissae against the percent of oxygen retained in the bath as plotted as ordinates. Referring to the FIG. 1 graph, it will be seen that the deoxidizing power of carbon in an iron bath is greatly enhanced by exposing the bath to a vacuum; and the greater the vacuum, the further the reaction proceeds to the right, i.e., toward the formation of carbon monoxide.

However, in the case of alloy steels, the problem involved is not simply that of the degree of deoxidation by carbon in an iron bath, but rather in a steel bath which also contains both other deoxidizing elements and alloying elements. Therefore, their effects must be considered. The presence of other deoxidizing elements may actually tend to block the $C+O \rightarrow CO$ (gas) reaction altogether. This is because oxygen will tend to react with the elements in the system that form the most stable oxides. The standard free energy-of-formation of a compound measures this stability, this being based on the reaction of one mole of oxygen with the element in question and designated $\Delta F°$ calorie per mole of oxygen. Relative $\Delta F°$ values for a number of oxides at 2912° F. are listed in Table I below in which the greater the negative value, the more stable the compound.

TABLE I

| Oxide: | F°, cal./mole × 10⁻³ |
|---|---|
| $ZrO_2$ | −178 |
| $Al_2O_3$ | −171 |
| $Ti_2O_3$ | −163 |
| $CO$ | −132 |
| $SiO_2$ | −130 |
| $V_2O_3$ | −123 |
| $MnO$ | −120 |
| $Cb_2O_4$ | −112 |
| $Cr_2O_3$ | −104 |
| $FeO$ | −72 |
| $MoO_3$ | −60 |
| $NiO$ | −36 |

These data show that for carbon to be an effective deoxidizer, Zr, Al and Ti must not be present, at least not in significant quantities, because oxygen will react with them rather than with carbon. Also, because $\Delta F°$ value of $SiO_2$ is so close to CO, silicon should be placed in the same category as Zr, Al and Ti. Conversely, the presence in the bath of Mn, Cb, Cr, Mo and Ni should not seriously impair the effectiveness of carbon as a deoxidizer.

Now the same reasoning must be applied to the carbide formers as was applied above to the oxide formers. The standard free energy of formation at 2912° F. of several carbides is listed in the following Table II based on the reaction with the elements listed of one mole of carbon ($\Delta F°$ calorie per mole of graphite).

TABLE II

| Carbide: | F°, cal./mole × 10⁻³ |
|---|---|
| $Co$ | −66 |
| $ZrC$ | −39 |
| $TiC$ | −38 |
| $Mo_2C$ | −33 |
| $Cr_{23}C_6$ | −19 |
| $VC$ | −17 |
| $Mn_7C_3$ | −14 |
| $SiC$ | −8 |
| $Fe_3C$ | +.7 |
| $Ni_3C$ | +6 |

As shown, the tendency of carbon to react with oxygen is far greater than its tendency to react with the other elements. Therefore, no consideration need normally be made to avoid the presence of elements in the bath that form compounds with carbon more stable than CO.

Next, however, the effect of alloying elements in the bath must be considered. Many of the same elements that were considered in terms of their deoxidizing power and carbide-forming power will be considered from this point of view. However, Zr, Al, Ti and Si will not have to be considered because, as Table I illustrates, they should not be in the bath if the $C+O \rightarrow CO$ (g) reaction is to provide the main mechanism of deoxidation.

In order to determine the effects of alloying elements, it will be necessary to first re-examine the $C+O \rightarrow CO$ reaction in detail. This reaction will tend to proceed until a balance or equilibrium between carbon and oxygen in the bath is achieved. Their balance is described by the following equation:

(2) $$K = \frac{PCO}{a_C \times a_O}$$

where K is the equilibrium constant and, at 2910° F., equals 500. PCO is the pressure of CO above the bath. At steelmaking temperatures of about 2910° F., and at the pressure levels (below 10 mm.) normally associated with degassing, PCO is essentially equal to the operating pressure of the degassing chamber. $a$ denotes the activity, or tendency of an element to react. The activity of carbon and oxygen are described as $a_C$ and $a_O$ respectively. The activity of an element is equal to its concentration (percent by weight) times some factor known as its activity coefficient ($f$) as indicated below for carbon.

(3) $\quad\quad\quad\quad a_C = \text{percent } C \times f_C$

Figure 2:
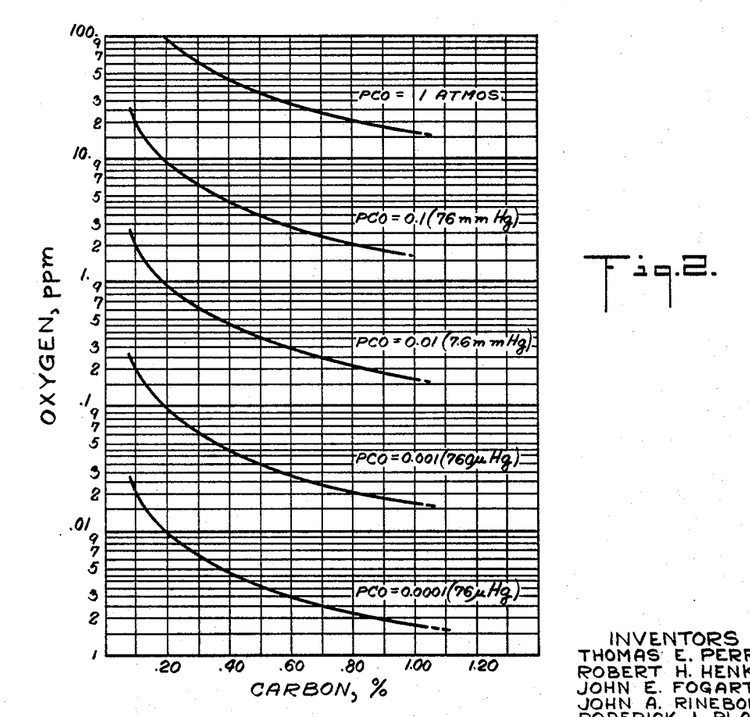
FIG. 2 is a graphical representation of the equilibrium conditions between carbon and oxygen in a molten steel bath at various atmospheric pressure levels to which the bath is subjected.

The above equation may now be rewritten as follows:

(4) $\quad 500 \times \text{percent } C \times f_C \times \text{percent } O \times f_O = PCO$ The $f_C$ in iron baths varies with carbon content and oxygen content. Similarly, the $f_O$ varies with oxygen content and carbon content. In other words, the values for activity coefficients depends on the interactions of the elements dissolved in liquid iron. They are easily calculated, however, using the interaction coefficients ($e$) tabulated in an article entitled "Electric Furnace Steelmaking" by J. Chipman and J. Elliot, AIME, Chapter 16, 1963, wherein the activity coefficient of carbon including the interaction effects of C and O ($f_C^{(C, O)}$) are calculated as follows for carbon:

(5) $\log f_C^{(C, O)} = (\text{percent } O \times e_C^O) + (\text{percent } C \times e_C^C)$ Similary for oxygen the equation is (6) $\log f_O^{(C, O)} = (\text{percent } C \times e_O^C) + (\text{percent } O \times e_O^O)$ These calculations have been made for various carbon levels. These data were then used in Equation 4 to determine the equilibrium oxygen contents, the results of which are plotted in FIG. 2 of the drawings.

Likewise the interaction effect of a given percentage of any alloying element such as Cr, Mo, V, etc. can be calculated from the following equation, wherein Y designates the element under investigation.

(7) $\log f_{C, O}^{\text{percent Y}} = (\text{percent } Y \times e_C^Y) + (\text{percent } Y \times e_C^Y)$ These calculations have been made for several percentages of Ni, Cr, No and V. The results are listed in Table III below.

TABLE III

Nickel

| Percent | $Ni, f_{C, O}$ |
|---|---|
| .25 | 1.00 |
| .50 | 1.01 |
| .75 | 1.03 |
| 1.00 | 1.05 |
| 1.50 | 1.06 |
| 2.00 | 1.08 |
| 2.50 | 1.11 |
| 3.00 | 1.13 |
| 4.00 | 1.16 |

Chromium

| Percent | $Cr, f_{C, O}$ |
|---|---|
| .25 | .96 |
| .50 | .93 |
| .75 | .89 |
| 1.00 | .86 |
| 1.50 | .83 |
| 2.00 | .81 |
| 2.50 | .75 |
| 3.00 | .65 |

Molybdenum

| Percent | $Mo, f_{C, O}$ |
|---|---|
| .25 | 1 |
| .50 | 1 |
| .75 | 1 |
| 1.00 | 1 |

Vanadium

| Percent | $V, f_{C, O}$ |
|---|---|
| .10 | .93 |
| .20 | .86 |
| .30 | .81 |
| .40 | .76 |
| .50 | .70 |
| 1.00 | .49 |

These data show that the presence of nickel in the bath enhances the deoxidizing power of carbon, whereas chromium and vanadium have detrimental effects, and molybdenum has no effect.

To illustrate the use of these values, consider the grades 1040, 4140, 4140+V, and 4340.

1040

Neglecting any effect of manganese, this grade, because it has no alloying elements, obviously has an effective carbon content of .40%.

4140

This grade contains 1% Cr. and .20% Mo. The $f_{C, O}^{1\% Cr} = .86$. The $f_{C, O}^{.20\% Mo} = 1$. So, $.86 \times 1 \times .40C = .34\%$ effective carbon.

4140—.20% V $f_{C, O}^{.20\% V} = .86$. So, $.86 \times .86 \times 1 \times .40 = .29\%$ effective carbon.

4340

This grade contains .80% Cr, 1.75% Ni and .25% Mo. So, $.88 \times 1.07 \times 1 \times .40 = .38\%$ effective carbon.

Therefore, because of the detrimental effects of Cr and V, carbon is a significantly more powerful deoxidizer in 1040 than in 4140+V, and because of the beneficial influence of nickel, carbon is a more powerful deoxidizer in 4340 than in 4140.

In summary, therefore, the deoxidizing power of carbon in a steel bath is greatly enhanced by efficient exposure to a vacuum and, the lower the pressure, the better. However, if the $C + O = CO (g)$ reaction is to provide the main mechanism of deoxidation, the presence of Zr, Al, Ti and Si in the bath should be avoided until after degassing. And, finally, some alloying elements such as Cr and V have detrimental effects on the power of carbon as a deoxidizer whereas others, such as Ni, have beneficial effects.

In the light of the foregoing considerations, certain essentials of the novel process of the invention for producing high purity steel of improved characteristics may now be explained. The invention is grounded in the use of carbon under vacuum degassing conditions for deoxidizing the steel. To this end the steel as prepared for the vacuum degassing operation must be free from the elements which have greater affinity for oxygen than carbon or substantially equal affinity thereto such as Zr, Al, Ti and Si as shown in Table I. In addition the presence in the steel of elements at this stage which are detrimental to efficient carbon deoxidation, such as Cr and V, should be avoided to the extent possible and these alloying additions made at a later stage as discussed below.

To this end the steel is melted in the electric or open hearth furnace to as low a content of each of these elements as possible as by careful selection of scrap. Other alloying elements which do not detrimentally effect the carbon deoxidation may, however, be added to the melt at this stage to the extent required in the final analysis, such for example as nickel. The carbon content, is, however, adjusted to a higher value than required for the final analysis to the extent required for deoxidizing the steel taking into consideration the effect of the various alloying elements present in increasing or decreasing the effective carbon, to the end as above explained with reference to Equations 5–7, inc., and Table III.

The steel as thus melted is then preferably treated with oxygen as by blowing with air or oxygen or by adding iron oxide in amount sufficient to remove any residual amounts of Zr, Al, Ti or Si present in the melt as well as to reduce the phosphorus and sulfur contents within the required upper limits therefor. During the oxygen treatment P and S go into the slag and are slagged off. The metallic elements Zr, Ti, Al, Si and Mn are oxidized successively in that order to $ZrO_2$, $TiO_2$, $Al_2O_3$, $SiO_2$ and MnO, and pass into the slag. Unlike Zr, Ti, Al and Si the manganese is seldom completely so removed, but is usually eliminated down to about 0.1%. The removal of carbon by oxidation follows the removal of silicon so that removal of the metallic elements above listed is substantially completed before any appreciable amount of the carbon is oxidized, thus retaining the carbon for the subsequent vacuum degassing deoxidation. The function of the oxygen treatment in removing sulfur is indirect, in that it causes the melt to boil as above explained, and this turbulence of the melt and the slag aids the transfer of sulfur from the melt to the slag which is slagged-off as above mentioned. During the oxygen treatment, some of any Cr or V present is oxidized and slagged-off and hence must be compensated for by addition at a later stage as discussed below, but Mo and Ni are not materially affected by this treatment.

When the oxygen treatment is thus completed, the molten steel bath is in a highly oxidized state, and as the next step of the process must now be deoxidized by carbon. This is accomplished by vacuum deoxidation or degassing which may be accomplished in either of two ways according to the invention.

One way is to cast the steel after giving it the oxygen treatment, directly into molds the product of which is to be consumable electrode electric arc remelted into a water cooled copper crucible under vacuum. During the remelting under vacuum, the steel is deoxidized by the carbon to CO gas which is drawn off through the evacuating system coupled to a gas-tight housing in which the crucible and arc melting equipment are contained during the remelt. This mode of vacuum deoxidation has the advantage that contact of the melt with refractories is eliminated, so that there can be no reoxidation of the steel from such source. A disadvantage of this technique is that no oxidizable alloying additions can be made to the steel after carbon deoxidizing.

This can be done, however, in accordance with the preferred procedure of the invention by transferring the molten steel following the oxygen treatment, into a refractory lined ladle which is then placed in a chamber having a gas-tight closure and subjecting therein to vacuum deoxidation or degassing, at the end of which any required alloying additions may be introduced into the melt from gas-tight containers having openings into the degassing chamber above the ladle. After the steel has been thus degassed and the composition adjusted by allowing additions as required, it is preferably cast directly into molds under vacuum or under inert atmosphere conditions, as by filling the molds with argon gas or the like, in order to prevent reoxidation of the steel.

During the degassing operation the degassing chamber and the molten steel therein is subjected to highly efficient and rapid steam jet evacuation operating on the venturi principle, which reduces the pressure below 100 microns in a short time as discussed below. During degassing the steel in the ladle is subjected to induction stirring to insure a controlled and uniform exposure of all metal to the vacuum. This induction stirring is so arranged as described below, as to completely recirculate the metal from the bottom to the top of the ladle at least once each minute. The ladle is made of non-magnetic metal, preferably 18–8 stainless steel, in order to avoid short-circuiting the magnetic field of the induction coils surrounding the same, which would otherwise limit the stirring efficiency of the system.

Before describing this system of evacuation in more detail, consideration must be given to the refractory lining for the ladle, since reoxidation of the molten steel bath from this source is a prime factor in setting the lower limit to which the steel may be deoxidized. Also the effect of the ladle refractory and induction stirring in facilitating evolution of the CO gas formed during deoxidation, requires discussion at this point.

With respect to these factors, let us first examine the relative stability of various refractory compounds in contact with pure iron at 2912° F. in terms of the following reactions:

(8)  $Fe + SiO_2 (S) = SiO (g) + FeO (l)$ (9)  $Fe + CaO (S) = Ca (g) + FeO (l)$ (10) $Fe + Al_2O_3 (S) = 2AlO (g) + FeO (l)$ (11) $2Fe + ZrO_2 (S) = Zr (g) + 2FeO (l)$

In these reactions, one of the products of refractory deterioration is a gas. The equilibrium pressures (below) of these gases indicate the tendency of the refractory to deteriorate and transfer oxygen into the metal bath. The greater the pressure, the greater the tendency to deteriorate.

| Gas | Equilibrium pressure (approx.), atmospheres |
|---|---|
| SiO | $1 \times 10^{-4}$ |
| Ca | $1 \times 10^{-8}$ |
| AlO | $1 \times 10^{-10}$ |
| Zr | $<1 \times 10^{-20}$ |

Again, however, we are here interested not in the stability of refractory-*iron* systems, but rather in refractory-*steel* systems. The chemical complexities introduced into production systems via slag contamination, etc., limit the value of the equilibrium pressures to indicators of the relative stability of the refractory compounds. Nevertheless, we have determined that high $SiO_2$ refractories will transfer oxygen into the steel more readily than will $Al_2O_3$ and far more readily than will $ZrO_2$.

Figure 3:
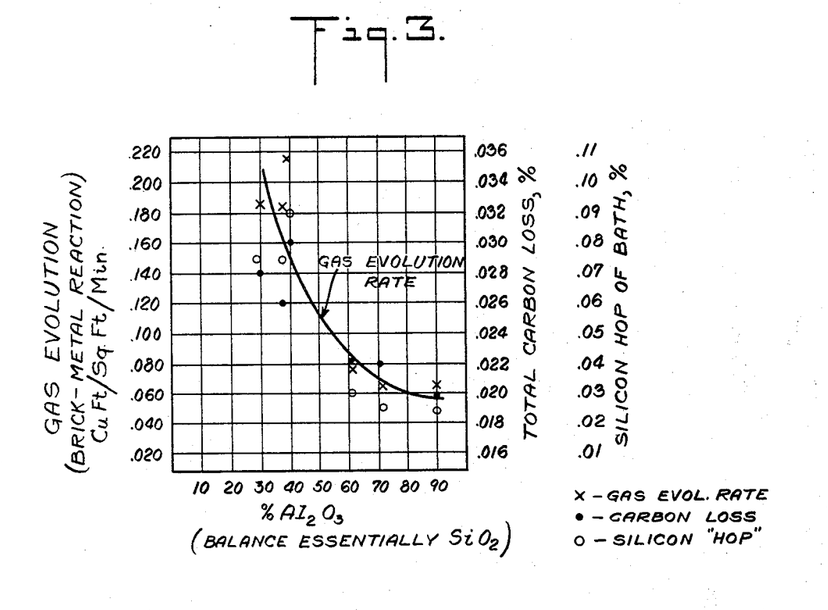
FIG. 3 is a graphical representation depicting the rate of gas evolution from various refractories in contact with molten steel under high vacuum conditions.

To illustrate, in a rather crude but nevertheless significant way, the relative stability of two of these refractory constituents in a steel system, the following experiment was conducted: Five pound controlled chemistry melts of AISI 1040 containing essentially none of the strong deoxidizers (Al, Zr, Si, etc.) were made in a zirconia-lined induction furnace. Sections of commercial bricks were immersed in the bath and the chamber evacuated to 100μ. The valve to evacuating system was then closed. The rate of pressure rise to 10,000μ was determined and subtracted from the rate of pressure rise to 10,000 on a similar trial which did not include the immersion of the brick sample. This difference provided a measure of the rate of deterioration (stability) of the brick. This experiment was conducted on samples of several commercial $Al_2O_3$-$SiO_2$ bricks of varying composition. Gas evolution rates were calculated from the pressure rise rates. The results showing increased stability for bricks with higher $Al_2O_3$ content, are plotted in FIGURE 3.

The difference in the rates of evolution for the various bricks would be related to the effect of carbon in the bath on the products of, for example, the $SiO_2 = SiO (g) + FeO$ reaction, as follows:

(12)  $2C + [SiO (g) + FeO] = 2CO (g) + Si + Fe$ or, the effect of carbon in the bath directly on the $SiO_2$ refractory ($SiO_2 + 2C = 2CO (g) + Si$). Assuming either of these reactions essentially describes the overall reaction, the bath C should be depleted to a greater degree with less stable refractories because they would provide more oxygen for the carbon of the bath to unite with and leave the system as CO gas. Similarly, the silicon content of the bath should increase.

To substantiate this, a second series of similar experiments was conducted but, in this case, the brick sections were immersed for 15 minutes while the bath was exposed at 100μ. As expected, the results did reveal both an increased silicon pick-up and a greater carbon loss with the higher $SiO_2$ brick sections. The results are also plotted in FIGURE 3.

It is obvious, therefore, that as the percent of alumina in the brick increases, the stability of the $Al_2O_3$-$SiO_2$ brick increases. And, conversely, as the percent of $SiO_2$ increases, the rate of deterioration of the brick increases as measured by the gas evolution rate, the carbon drop rate, and the rate of silicon pick-up in the bath. Concurrently, of course, the *rate* of oxygen transfer to the steel is also greater with low stability brick.

Another very significant phenomenon applicable to any of these refractories is also inferred by Equations 8–11 inc. i.e., the lower the oxygen content of the metal, the greater the amount of refractory deterioration and oxygen "feedback."

Therefore, the refractory with the greatest chemical stability (consistent with its cost, physical properties, etc.) must be utilized if optimum efficiency is to be achieved by carbon deoxidation.

In addition, for any refractory system, alloy elements in the steel bath have an influence on the tendency of refractories to deteriorate. Elements, such as Cr, that form oxides of greater stability than iron have a detrimental effect. Conversely, elements such as Ni, that would form oxides of lower stability, have a beneficial effect on the rate of refractory deterioration.

Therefore, two competitive reactions will be the proceeding simultaneously, one transferring oxygen to the bath (refractory deterioration) and one removing oxygen from the bath (carbon deoxidation). Obviously, the final oxygen content of the bath depends on the relative rates of these reactions.

Once the specific ladle refractory system has been chosen, the maximum rate of oxygen transfer to the bath (for a given grade of steel) is fixed. As indicated earlier, the most stable refractories would provide the lowest and least offensive reoxidation rates. Although their use is most desirable from this point of view, their high cost generally limits their applicability in production systems. Significant compromise may result as discussed below.

Competing with the reoxidation rate is the deoxidation rate, the latter being described by the carbon boil $[C+O=CO\ (g)]$ reaction. The rate of this reaction is limited by the rate of oxygen transfer in the steel bath.

More significantly, however, it is limited by the rate of nucleation of CO bubbles. Such factors as surface tension significantly limits the spontaneous formation of CO bubbles within a metal bath, at its surface, or at the slag-metal interface if a slag is present. As a result, because the ratio of surface area to bath volume is normally so extremely low, the rate of bath deoxidation by this mechanism is almost negligible. However, CO is readily released into the surface pores of the refractory container. A pore is a gas-filled crevice so small that the metal penetration is prevented. The maximum size of such a pore is given by the following equation:

$$(13) \qquad r = \frac{2\gamma \cos \theta}{p}$$

where $\gamma$ is the surface tension of the metal (approximately 1500 dynes/cm.); $\theta$ is the contact angle of the metal and the refractory (about 120°); and $p$ is the ferrostatic pressure of the bath ($4.6 \times 10^5$ dynes per sq. cm.).

At steel depths up to several feet, the maximum pore size is relatively large. Therefore, up to such depths there is an abundance of such sites. The gas volume in the sites increases by the diffusion of carbon and oxygen from the metal to the sites where CO is formed. The growth continues until the bubble breaks away and rises out of the metal leaving sufficient gas behind to keep the original refractory crevice filled. The cycle is repeated again and again as long as the condition for growth permits.

This condition requires that the sum of the atmospheric pressure, the ferrostatic pressure and the capillary over pressure (equal to $2\gamma/r$) be exceeded by the virtual CO pressure which is proportional to the product of the effective carbon and oxygen contents in the bath. Obviously, the further away from equilibrium, the greater the virtual CO pressure.

With respect to atmospheric pressure, consider that before the steel was tapped from the furnace and vacuum applied, this reaction pressure was in equilibrium with an atmospheric pressure of 1 atmosphere. By applying the vacuum, a pressure equivalent to that exerted by a depth of near four feet of steel can be affected.

Therefore, even in the absence of stirring as discussed below, CO bubbling originally occurs quite deep in the bath. As the reaction proceeds, and the reaction pressure approaches equilibrium with the atmospheric pressure of the vacuum chamber, the depth of the bubbling diminishes. In other words, CO bubbles will form deeper in the bath (along the refractory walls) early in the degassing cycle when the greatest deviation from equilibrium exists. As the reaction proceeds, and equilibrium is approached, the depth of the boil diminishes to just below the metal surface. The activity of the boil progressively declines from very vigorous to very gentle as the depth of the boil recedes. Obviously, the rate of deoxidation of the bath is simultaneously decreasing.

If, however, an efficient system of stirring, such as induction stirring, is provided to transfer the metal continuously from the bottom of the ladle (where the ferrostatic pressure prevents CO bubbling) to the upper active areas, bath equilibrium will not be approached within practical time limits.

Therefore, induction stirring is utilized in accordance with this aspect of the invention to insure a controlled, uniform exposure of all metal to the vacuum. Also a highly stable refractory lining for the ladle is employed, i.e., one containing 70% or more of alumina, the balance being essentially silica. In addition, as above stated, a steam-ejector evacuating system is preferably employed for rapidly evacuating the ladle degassing system.

In the accompanying drawings, FIGS. 4–11, inc., illustrate, in accordance with a preferred embodiment, the induction stirred, ladle-type vacuum degassing system under discussion.

Referring to the drawings, and more particularly for the moment to FIGS. 4–8, inc., the degasing chamber shown generally at 10, comprises an upstanding, generally cylindrical steel chamber 11, mounted on an appropriate base 12 of concrete or the like, in gas-sealed relation thereto. The chamber 11 may be closed to atmosphere by means of a steel, removable cover 15, disposable on the top of the chamber in the manner indicated.

The cover 15 is penetrated by a sight port 16, for visually inspecting the progress of the degassing operation. The cover is also provided with a port 17 normally closed by a removable cover plate 18, between which and the port flange 19 is interposed a seal-spray sleeve. The purpose of this is to permit, if desired, upon removal of the cover plate 18, of teeming molten metal from a ladle disposed above the degassing chamber, thence through the seal-spray sleeve and port 17 into a second ladle disposed within the degassing chamber. The cover plate 15 is also provided with a further port as indicated at 23, FIGS. 9 and 10, for introducing into the molten bath 24 in the ladle 22, various alloying additions, from an evacuated hopper, as at 25, FIG. 9.

Figure 4:
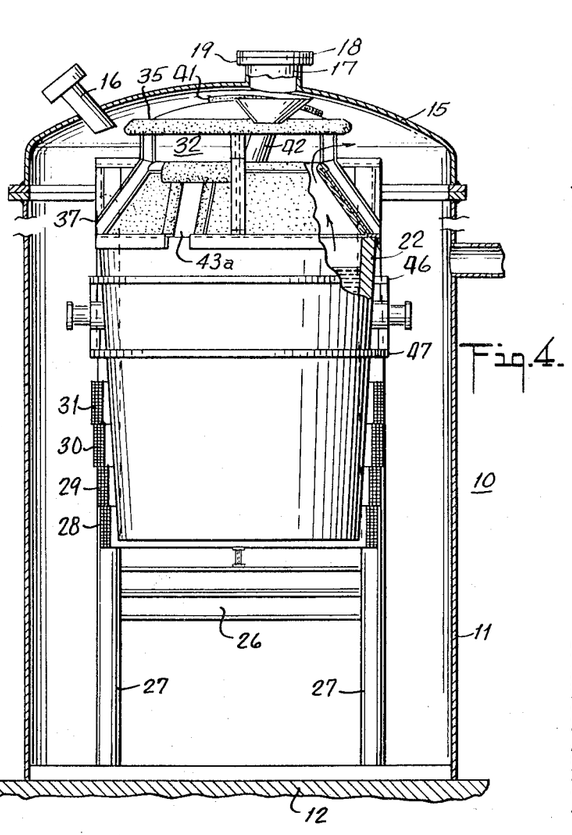
FIG. 4 is a view in axial, sectional elevation of the evacuating chamber, electrical stirring coils, ladle, splash cover and chamber cover assembly, of a complete vacuum degassing apparatus as arranged for a degassing operation in accordance with a preferred embodiment of the invention.

As shown in FIG. 4, the ladle 22 is supported within the degassing chamber 11 on a structural steel framework 26 carried by upstanding posts, as at 27. The framework also supports a series of four electrical coils 28–31, inc., which extend circumferentially about the lower half of the ladle 22 with the latter resting on the framework 26 as shown, these coils serving to provide magnetic stirring of the molten steel bath in the manner above mentioned and discused below.

Also referring to the FIG. 4 assembly, a splash cover, indicated generally at 32, is removably suported atop the ladle 22, the purpose of which is to prevent the molten metal, during the boiling or effervescing thereof which occurs during the degassing operation, from spilling over the upper edge of the ladle and thence down into the space between the ladle and the degassing chamber. This splash cover also serves to conserve the heat of the molten metal during the degassing operation by reflecting the heat incident thereon from the molten metal back into the molten metal bath.

Figure 5:
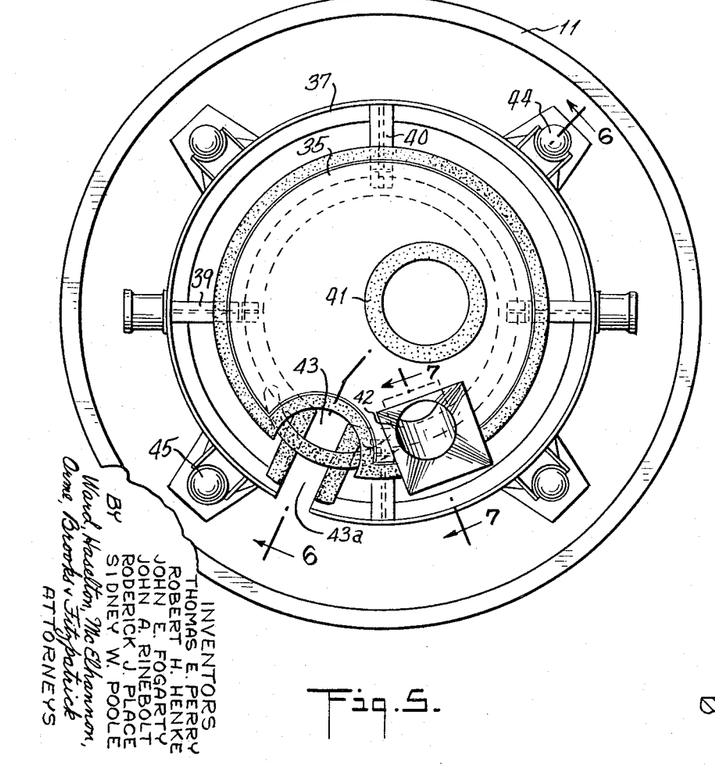
FIG. 5 is a top plan view of the FIG. 4 assembly with the cover of the degassing chamber removed.
Figures 6, 7, 8:
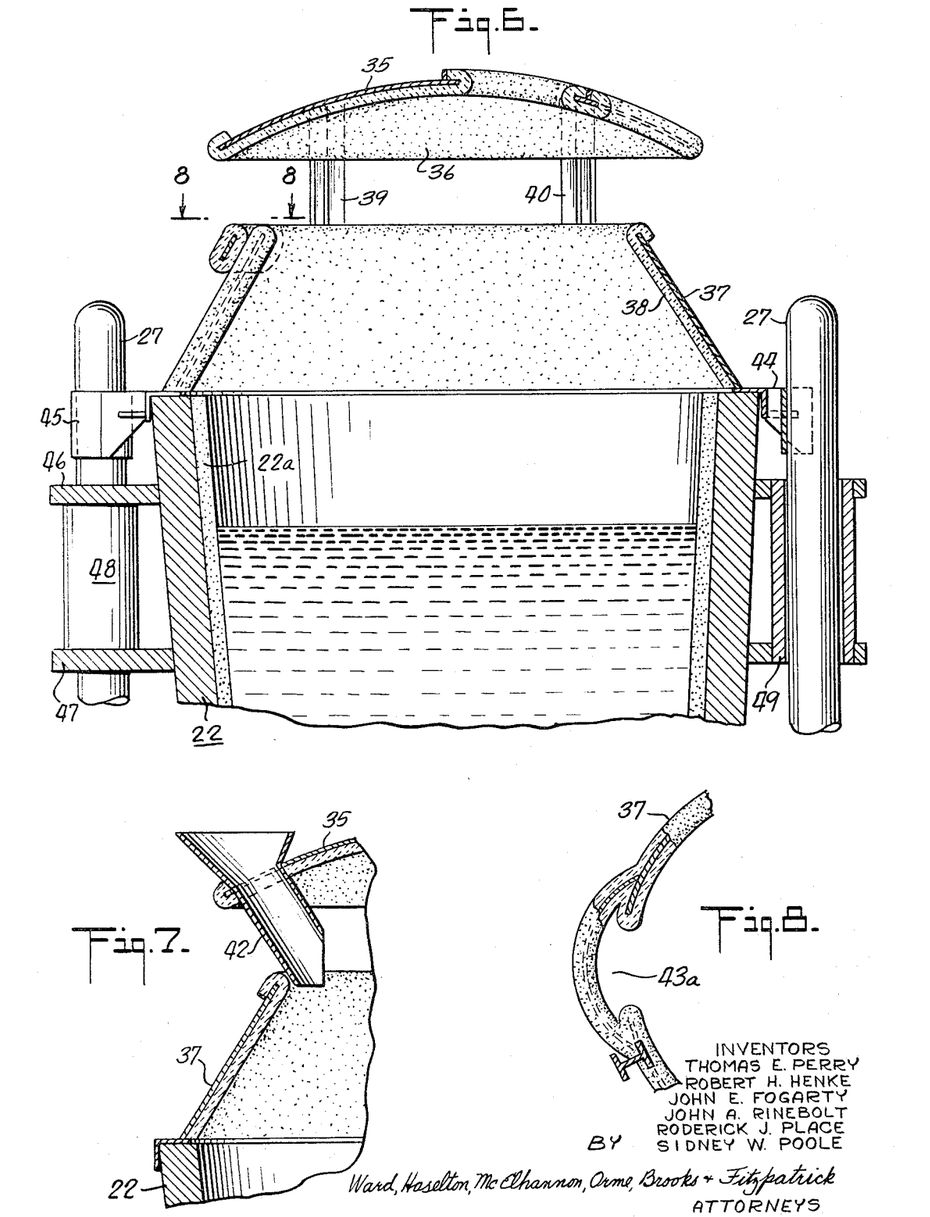
Figure 9:
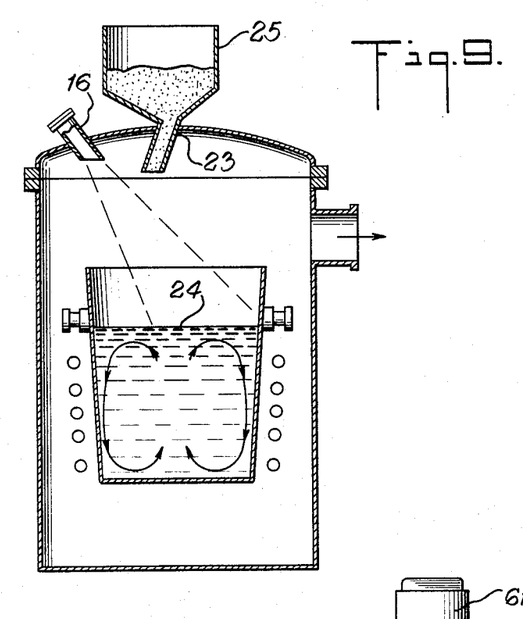
FIG. 9 is a more or less schematic showing in axial, sectional elevation of the degasser and ladle assembly corresponding to the view of FIG. 4, but illustrative of the magnetic stirring action of the molten steel bath.

This splash cover, as shown in FIGS. 4–7, inc., comprises an arcuately-shaped upper steel cap portion 35 which is refractory lined, as at 36, beneath which is disposed in spaced relation a lower base portion 37 of truncated, conical contour as best shown in FIG. 6, likewise made of steel plate and refractory lined, as at 38. The cap and base portions 35, 37, are integrated in spaced relation by means of four structural steel posts, as at 39, 40, welded at their opposite ends to the cap and base portions, respectively.

Referring to FIGS. 4 and 5, the cap 35 of the splash cover is provided with a refractory lined port, as at 41, which with the apparatus assembled as shown in FIG. 4, is disposed in alignment with the teeming port 17 of the degasser chamber cover 15 in order to permit carrying out of the teeming operation referred to above. The cap 35 of the splash cover is also penetrated by a chute 42, which with the apparatus assembled as in FIG. 5, is in registry with the charging port 23 of FIG. 9 (not shown in FIG. 4) for charging alloying additions into the molten bath of the ladle 22.

The splash cover cap and base members 35, 37, are further provided with cut-out portions, as at 43, 43a, FIGS. 5 and 8, which with the apparatus assembled as in FIG. 4 are in alignment with the sight port 16 in order to permit visual inspection of the molten steel bath within the ladle 22 during the degassing operation. In order to assure proper registry of the ports 41, 42, of the splash cover with the ports 17, 23, of the degassing chamber cover 15, the splash cover has secured about the lower periphery of its base 37, a series of sleeved lugs, as at 44, 45, which fit over the upstanding posts 27 of the degassing chamber assembly.

Referring to FIGS. 4 and 6, the upper portion of the ladle 22 is circumscribed by a pair of spaced ring members 46, 47, welded thereto, which mount a series of sleeves, as at 48, 49, FIG. 6, which likewise sleeve onto the posts 27 for properly aligning the ladle with the splash cover 32 and the chamber cover 15 in the manner above described.

Referring to FIG. 6, the ladle 22 is made of a non-magnetic steel, such as an austenitic or 18-8 chrome nickel steel, in order to minimize interference with the magnetic stirring of the molten steel bath 24. Also the ladle is provided with a chemically stable, refractory lining 22a, such as a high alumina content brick containing preferably about 70-80% aluminum oxide, $Al_2O_3$, for reasons above discussed.

Figure 10:
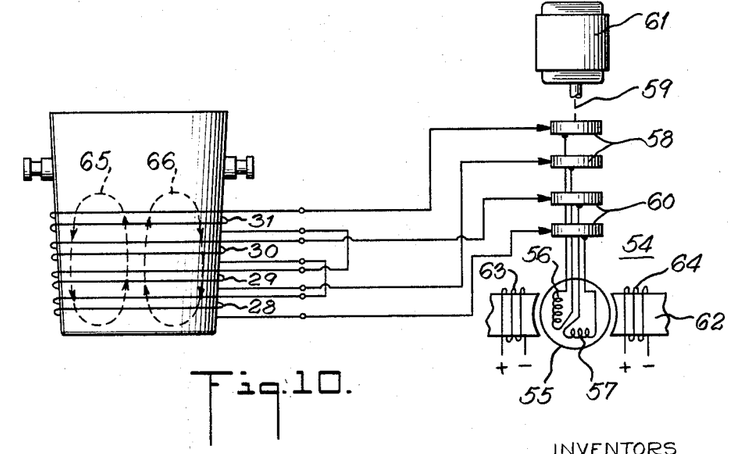
FIG. 10 is a diagrammatic showing of the electrical circuit connections from a two-phase alternating current generator to the stirring coils of the FIG. 4 degassing apparatus assembly, both figures also showing the positioning of the ladle within the stirring coils.

Referring to FIG. 10, the magnetic stirring coils 28-31, inc., are connected to the output of a two-phase alternating current generator 54 in the manner therein shown. The rotor 55 of this generator is provided with two separate phase windings 56 and 57, the first of which is connected between a pair of slip rings 58 on the generator shaft 59, and the second of which is similarly connected between a pair of slip rings 60. The stirring coils 31 and 29 are connected in series with each other between the slip rings 58 energized by the generator phase coil 56; while the stirring coils 30 and 28 are likewise connected in series with each other between the generator slip rings 60 energized by the generator phase coil 57. The rotor of the generator is driven by an electrical motor 61 mounted on the common shaft 59 with the generator rotor. The generator stator 62 is excited in the conventional manner with direct current excitation of the stator coils 63, 64.

The phase difference in the voltage generated in the rotor coils 56, 57, is preferably on the order of about 120° as a result of which the stirring coils 28, 30, on the one hand, and 29, 31 on the other, are successively energized at this phase difference and as a result of which the molten bath is magnetically stirred in the manner indicated by the arrowed paths, 65, 66 in which the metal is continuously impelled upwardly from the lower central portion of the ladle to the top of the molten bath and returned along the refractory wall of the ladle from the top to the base thereof. The direction of stirring may be reversed by reversing the connections to either of the generator phase windings 56, 57, as by reversing the connections to the slip rings 58 or those to the slip rings 60. The generator is so rotated as to generate an alternating current of ½ cycle per second or 30 cycles per minute, and sufficient power is applied to cause a complete turn-over of the molten metal bath once each minute.

Figure 11:
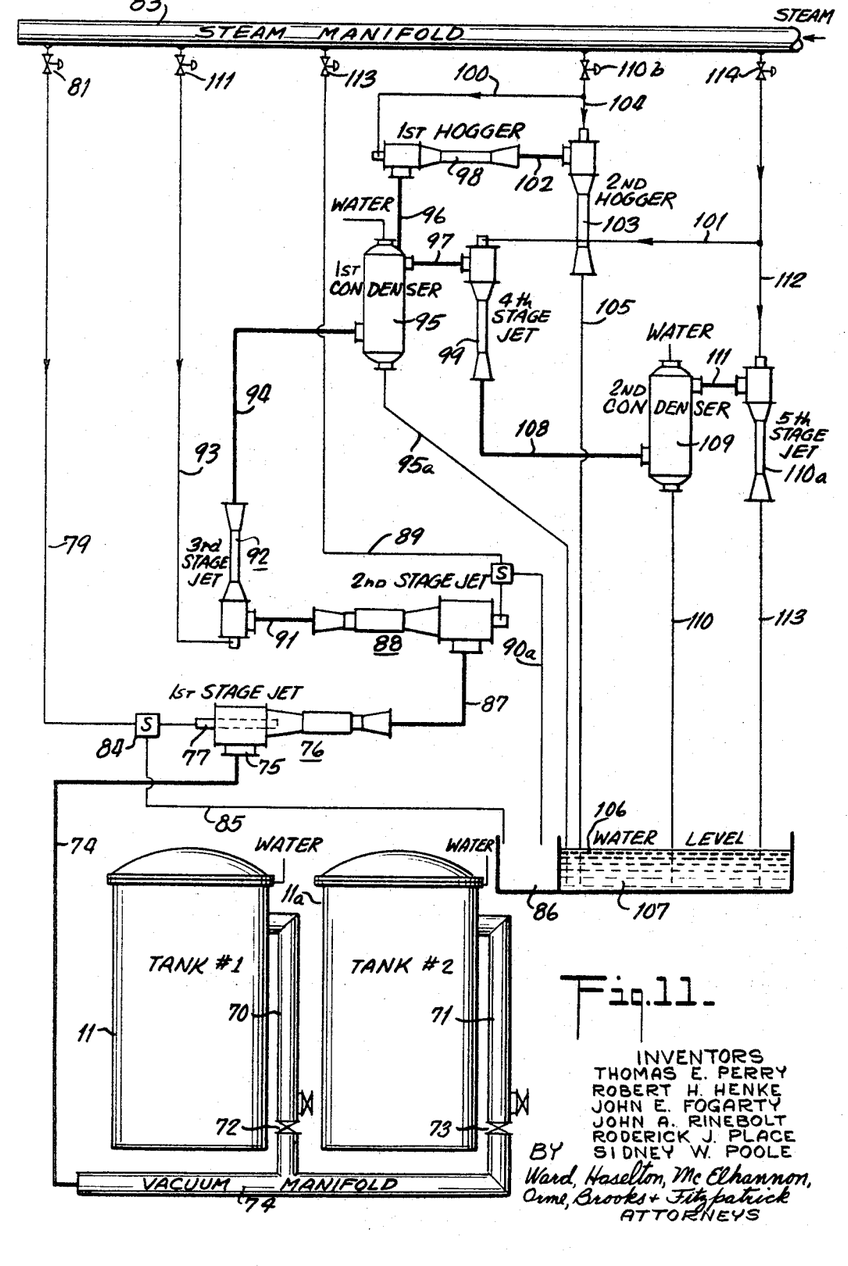
FIG. 11 is a diagrammatic layout of a steam jet aspirated, venturi tube evacuating system for evacuating the degassing chamber of FIG. 4.

Reference will now be had to FIG. 11 for a description of the evacuating apparatus for degassing chamber 11 of the FIG. 4 assembly. In FIG. 11, two degassing chambers 11 and 11a are shown, from which extend evacuating conduits 70, 71, connected through shut-off valves 72, 73, to a vacuum manifold 74, which extends to the input at 75 of a venturi tube, steam jet evacuator 76, into which during evacuation, steam is injected through jet 77, supplied with steam under pressure over line 79, and through valve 81, from a steam manifold 83. Line 79 contains a steam separator 84, the condensate from which drains over line 85 into a sump 86.

Venturi 76 comprises a first stage of steam jet evacuation, the exhaust from which extends over a line 87 to the input of a second stage venturi jet 88, having steam line 89, and drain line 90a, connected thereto. Similarly the exhaust from the second stage jet 88, extends over line 91 to the input of a third stage jet 92, to which extends a steam injection line 93. The exhaust from the third stage jet extends over line 94 to a condenser 95, a drain line 95a from which extends to a sump 107 providing a water seal, as at 106.

From the condenser 95, gaseous exhaust lines 96 and 97 extend to the inputs, respectively, of a first "hogger" venturi 98 and to a fourth stage venturi 99, both supplied with steam from the manifold 83 over line 100 and 101, respectively. The exhaust from the first hogger is conveyed over line 102 to the input of a second hogger 103 having steam injection over line 104 and the exhaust from which exhausts to atmosphere over line 105 and through the water seal 106 of sump 107. The exhaust from the fourth jet stage is conveyed over line 108 to condenser 109, the condensate from which drains over line 110 in water-sealed relation into the sump 107, and the gaseous exhaust from which is conveyed over line 111 to the input of a fifth stage venturi 110a supplied with steam over line 112 and the exhaust from which is exhausted to atmosphere over line 113 through the water seal 106 of sump 107.

In the operation of the evacuating system, the two hogging or roughing jets 98, 103 and 99, 110a, fourth and fifth stage jets, are used first by opening the steam valve 110b to inject steam therein over lines 100, 104, and steam valve 114 to inject steam over lines 101, 112, while maintaining closed the steam valves 81, 82 and 111-113, inc., controlling the other jets. For an approximately 100-ton heat of steel to be degassed in chamber 11 or 11a, the hogging jets and fourth and fifth stage jets pull down the vacuum to about 30 mm. of mercury. At this stage the two hogging units are turned off, by closure of valve 110b, and the series of third to first stage jets are then brought successively into action to reduce the pressure further. These jets are turned on singly, by opening the steam valves 81, 82, 111, etc., controlling the same, and each helps to pull down the pressure another step until it is reduced to about 50 microns in about eight minutes. During the degassing operation the magnetic coils 28-31, inc., in the vacuum chamber are energized to circulate the liquid metal in the ladle in order to facilitate the degassing operation as above explained.

A typical production run is as follows. First the heat (for example, AISI 52100 steel of composition about 1% carbon, 1.4% chromium, .25/.45% manganese, .20/.35% silicon, balance iron) is air melted in an electric furnace. All alloy additions are made in the electric furnace as specified with respect to the composition with the exception of silicon.

After the charge is melted, oxygen is introduced into the molten; metal. This can be done either by blowing the melt with a highly concentrated dry oxygen gas using a suitable lance for introducing oxygen at the surface of the molten metal, or by adding iron oxide. The oxygen addition provides temperature uniformity and the elimination of any metallic deoxidizers such as aluminum, silicon, etc., present in the initial scrap used in the melt.

During the finishing period of the first melt a carbide slag is used as the finishing slag in order to refine the steel and to maintain a minimum oxygen level consistent with the carbon content and the bath temperature.

The carbon content of the bath is adjusted to the desired carbon aim just prior to tapping the bath. The carbon can be added in various forms. For example, if chromium is required in the ultimate product, the carbon and chromium can be added in the form of pig iron either by itself or to supplement any ferrochrome that is added.

The amount of carbon added is calculated roughly on the basis of approximately 100-150% of the theoretical amount required to convert to carbon monoxide the oxygen present in the iron, and to supply the desired carbon "aim" for the ultimate product. The calculated amount of carbon to be added should allow also for any carbon already present in the iron. Therefore, the amount of carbon to be added, regardless of the form of addition, can be calculated roughly as the carbon "aim" plus 1–1.5 times the stoichiometric amount required to reduce the oxygen present to carbon monoxide, minus the amount of carbon already present in the iron.

The molten metal is tapped and poured into suitable ingot molds. Since there are no strong metallic deoxidizers present and there is very little residual manganese, the steel is poured "open" and gas evolution proceeds during solidification in the ingot mold.

For the above grade of steel, tapping temperatures are 50° to 100° F. above normal. At tapping time, the bath is not boiling. The heat reflecting cap is placed on the ladle, and the ladle is transferred quickly to the degassing chamber where it is lowered into the already activated stirring coils. Evacuation starts immediately after the cover is closed.

During the early stages of evacuation, an extremely active boil occurs in the molten steel bath. This boil, which is caused chiefly by the rapid evolution of hydrogen and carbon monoxide gas, may be observed through the sight ports of the chamber cover. Boiling continues vigorously as the pressure is dropped, but gradually diminishes with time and pressure. When it has substantially subsided at about 50 microns for a predetermined period of time, the end point is reached. Then, silicon in the required amount and a small amount of aluminum, as discussed below, are added from the feed hoppers, the magnetic stirring coils being used to assure complete uniformity of the bath.

Next, the degassing chamber may be partially backfilled with nitrogen, then with air. The cover of the degassing chamber is then removed, and the ladle is removed and conveyed to the teeming framework. Because of the very low oxygen levels, the degassed steel is preferably poured under an inert gas protection, such as argon. Without this protection, oxygen would be reabsorbed into the steel, and the low levels could not be maintained in the final product. After the steel has been degassed only very small additions of aluminum are needed to achieve proper grain sizes. The addition of aluminum at this stage is also desirable in completing the deoxidation, particularly at lower carbon levels where the carbon deoxidation becomes less effective. Residuals of 0.02 to 0.04% aluminum are typical. If aluminum is thus employed as a final deoxidizer, silicon serves little or no deoxidation purpose at all when added at this stage for steel made by the process of the present invention. It can be omitted entirely except to the extent called for by specifications, or for purposes other than deoxidation, such as for imparting hardenability to the steel, etc.

In steel as degassed by the process of the present invention, the hydrogen content of the degassed steel will typically run about one to two parts per million (p.p.m.), and oxygen and nitrogen values will be about one-half the levels obtained in conventional electric furnace steels. For AISI 52100 steel of the above composition as produced in the electric furnace, the oxygen content is about 18–20 p.p.m., which is reduced by the degassing process of the present invention to below 11 p.p.m. For grade AISI 4340 steel, the standard oxygen content as produced in the electric furnace is about 25–30 p.p.m., which again is reduced to below 15 p.p.m. by the degassing process of the present invention. For steel of grade AISI 8620, the standard oxygen content as produced in the electric furnace is about 30–35 p.p.m., which is reduced by the present invention to below 20 p.p.m. With all of these steels, nitrogen in the degassed product is about one-half of the normal electric furnace melt practice.

To summarize the production of high purity steel employing the vacuum degassing procedure above discussed with reference to FIGS. 4 to 11, inc., of the drawings: If the final alloy steel composition is to contain any of Zr, Al, Ti or Si, these must be added after vacuum degassing. If manganese is required in the final analysis, this may be added before or after degassing. With reference to elements such as chromium or vanadium which impair the effectiveness of the carbon during the degassing, carbon deoxidizing treatment, these preferably are added to the melt where required after degassing. This is also true with respect to molybdenum, which although it does not, as shown by Table III above, impair the effectiveness of the carbon during deoxidizing, degassing treatment, nevertheless does appear to have a detrimental effect when added to the steel prior to degassing. The reason for this is not presently known. On the other hand, elements which have a substantially lesser affinity for oxygen than does carbon, such as V, Cb, Ni, etc., as shown by Table I, may be added to the steel where required, prior to degassing.

The steel as produced in the manner above described with reference to FIGS. 4 to 11, inc., can be further improved by a subsequent vacuum arc remelting of consumable electrodes cast therefrom. In such case, however, any of Zr, Al, Ti and Si required in the final chemistry, must be added thereto after ladle degassing and prior to vacuum arc remelting. If any of these elements are present in the steel prior to vacuum arc remelting then very little of any residual oxygen present is removed by this treatment, because when any of these elements are added as above they function as deoxidizing agents to remove the oxygen by formation of solid oxides as above discussed. Despite this, however, vacuum arc remelting of such steels is nevertheless advantageous, because it results in less freezing segregation, plus some further reduction of residual nitrogen and hydrogen present in the steel, and to a lesser extent also oxygen.

If the final steel composition requires the presence of none of the elements having higher affinity for oxygen than does carbon, such as Zr, Al, Ti or Si, then vacuum arc remelting accomplishes the same ends as does the ladle degassing above described, plus the advantage of more complete carbon deoxidation due to more favorable kinetics, absence of refractories, higher temperatures employed and higher vacuums obtainable. Most important of these is the absence of refractories in vacuum remelting, and hence the absence of reoxidation due to contact of the melt with refractories.

In steel as conveniently produced in an electric or open hearth furnace, the manganese content normally runs around 0.70–0.90%. In the high purity steels as produced in accordance with the present invention the upper limit for manganese is 0.25% maximum, and preferably not over 0.15 or 0.20%, except of course where the required composition of the steel actually calls for a higher manganese content. As above pointed out during the vacuum degassing treatment both hydrogen and nitrogen are evolved from the steel, in addition to removal of the oxygen.

The invention applies primarily to the production of high purity steels which undergo martensitic hardening on quenching, in contrast to the austenitic steels. The steels which undergo martensitic hardening on quenching are in general the low alloy structural steels, such for example as 52100, 4360, 8620, 4140 and 4330.

The following examples are illustrative of the improved properties of steels produced in accordance with the invention as compared to steels as conventionally produced.

Steel 4340 as conveniently produced by electric furnace air melting and deoxidized with metallic deoxidizers, such as Al-Si, had the following composition: 0.40 C, 0.75 Mn, 0.28 Si, 0.80 Cr, 1.80 Ni, 0.25 Mo, 0.03 Al, 1–3 p.p.m. $H_2$, 20–40 p.p.m. $O_2$ and 80–120 p.p.m. $N_2$. On vacuum arc remelting the gaseous contents were reduced to under 1 p.p.m. $H_2$, 5–10 p.p.m. $O_2$ and 70–100 p.p.m. $N_2$. As rolled into plate, austenitized, quenched and tempered at 400°

F. the mechanical properties were as given in Table IV below.

For comparison purposes, a modified 4300 type steel was produced with the objective of demonstrating the principles of this invention. The steel was produced in an electric (80-ton) furnace and cast into molds without benefit of strong metallic deoxidation. Vanadium was used for grain size control rather than aluminum. During vacuum arc remelting of this steel, vacuum carbon deoxidation occurred so that the final gas level in the end product was approximately 2 p.p.m. of oxygen, 24 p.p.m. of nitrogen, and less than 1 p.p.m. of hydrogen. The balance of the chemistry was as follows: 0.56 C, 0.14 Mn, 0.02 Si, 0.89 Cr, 2.01 Ni, 0.42 Mo and 0.16 V. It is, of course, obvious that whether carbon deoxidation is accomplished during vacuum arc remelting or vacuum degassing, the principle of the invention remains essentially the same and relative beneficial results occur in either case. This steel as rolled into strip, austenitized, quenched and tempered at each of 400 and 600° F., had the properties given in Table IV below for comparison with those shown for 4340 as above noted. In this table L and T designate the directions longitudinal and transverse to the rolling direction.

Figure 15:
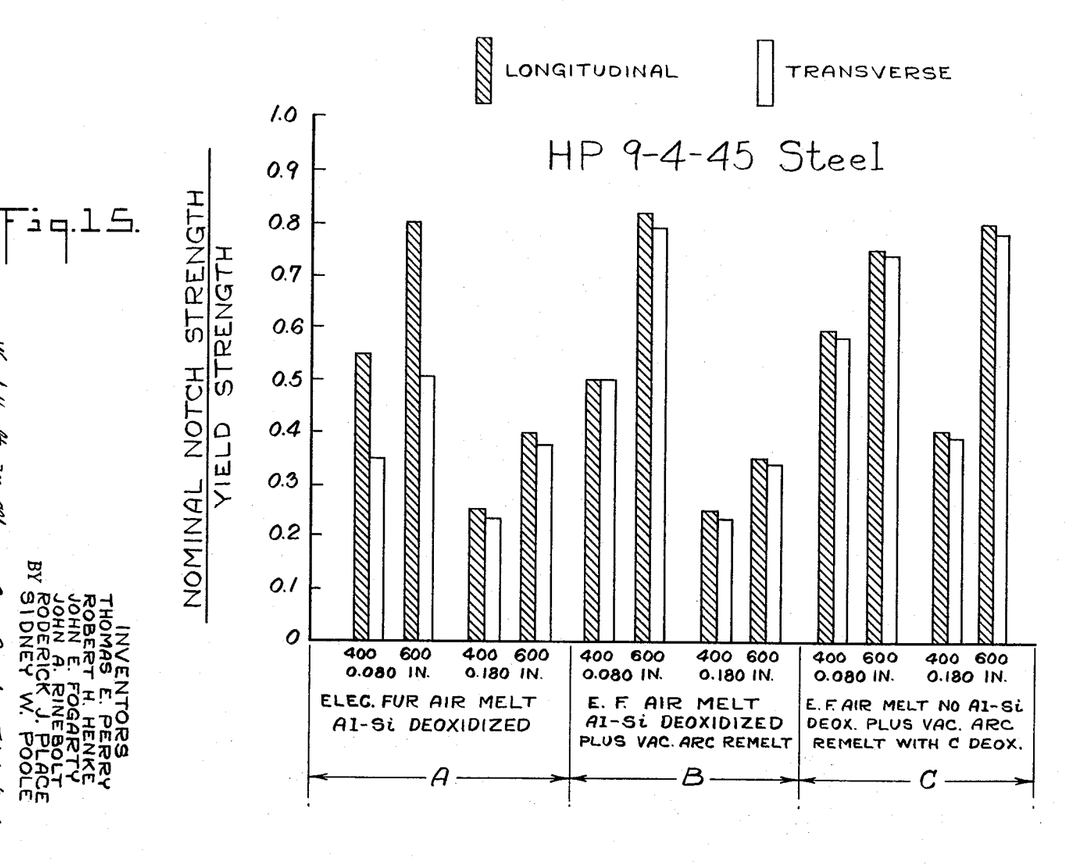
FIG. 15 is a graphical showing of the nominal notch strength values of HP 9-4-45 steel as measured both transverse and longitudinal to the rolling direction for this steel: A as conventionally produced by electric furnace air melting and aluminum-silicon deoxidizing; B as produced by electric furnace air melting and aluminum-silicon deoxidizing followed by vacuum arc remelting; and C as produced in accordance with the present invention without aluminum-silicon deoxidation, but as carbon deoxidized by vacuum arc remelting.

FIG. 15 gives comparative data with respect to the notch strength toughness of the HP 9-4-45 steel: as electric furnace air melted and Al-Si deoxidized as shown at A; as thereafter vacuum arc remelted, as shown at B; and as produced in accordance with the present invention by electric furnace air melting, oxygen treating to eliminate metallic deoxidizers, and thereafter carbon deoxidized by vacuum degassing, as shown at C. The test data is given for specimens of each steel as thus produced in 0.08 and 0.180 inch gages and as austenitized, quenched and tempered at each of 400 and 600° F. Also as shown specimens of each were tested in the directions transverse and longitudinal to the rolling direction.

As shown at A, the conventionally killed steel shows the expected relationship between longitudinal and transverse properties together with increased sensitivity to the test in the heavier gage. As shown at B vacuum arc remelting has resulted in almost complete elimination of directionality, but the gage sensitivity remains. As shown at C production of the steel in accordance with this invention shows improvement in notch strength as tempered at 400° F. for the lighter gage, and a major improvement at both tempering temperatures for the heavier gage.

It will be evident from the above data that application

TABLE IV

| Steel | Dir. | Temperature, °F. | K s.i. | | Percent | | Charpy, ft./lbs. |
|---|---|---|---|---|---|---|---|
| | | | US | YS | El | RA | |
| 4340 | T | 400 | 267 | 219 | 9 | 30 | 13 |
| 4350 Mod | T | 400 | 308 | 260 | 7 | 20 | |
| 4350 Mod | L | 400 | 326 | 250 | 10 | 26 | 11 |
| 4350 Mod | T | 600 | 265 | 243 | 7 | 29 | |
| 4350 Mod | L | 600 | 270 | 244 | 11 | 48 | 12 |

Thus the 4350 Mod. steel as produced according to this invention has a much higher yield strength together with the same or higher ultimate strength depending on the tempering temperature and about the same ductility and toughness as the 4340 steel. Also the hot workability of the 4350 Mod. steel was as good as that of 4340.

Figure 12:
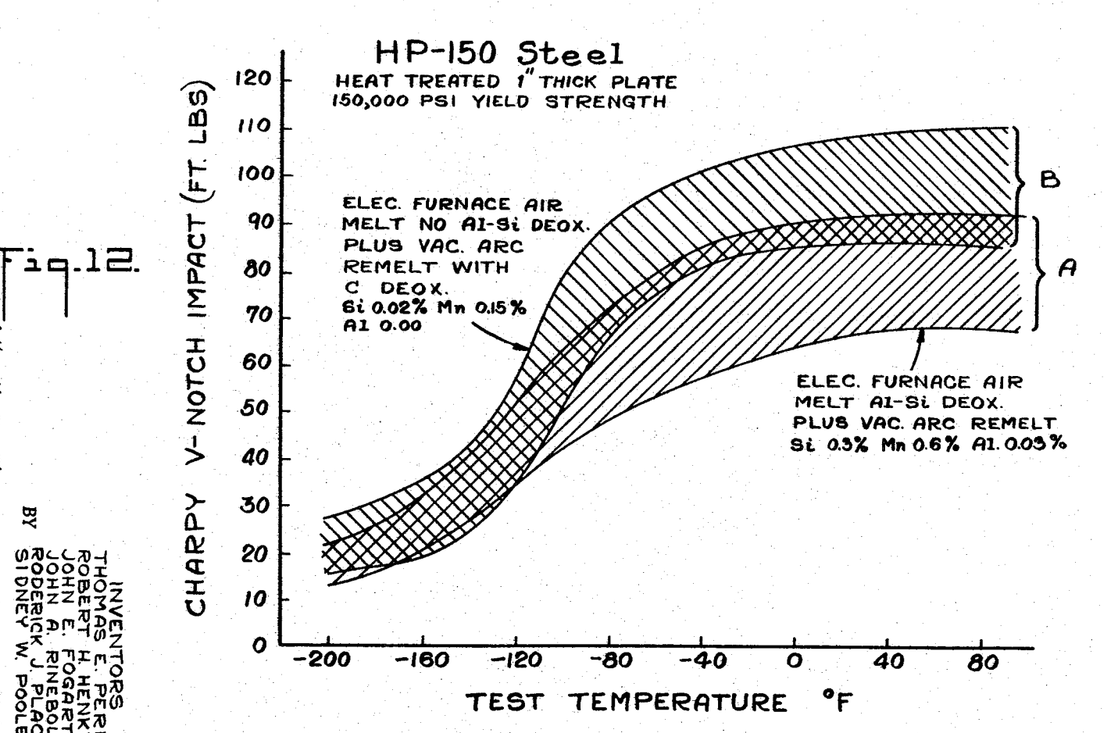
FIG. 12 is a graphical showing of the relation between Charpy impact strength and testing temperature for HP-150 steel as conventionally produced and also as produced in accordance with the present invention as hereinafter described.

Another example of the improvement in steel properties resulting from this invention vis-à-vis conventional practice, is shown by the following comparative tests on HP-150 steel. In the drawings FIG. 12 shows the relation between Charpy impact values and testing temperature for this steel as conventionally produced by electric furnace melting, Al-Si deoxidized and vacuum arc remelted, the Charpy impact values for which are shown at A, and this steel as produced according to this invention and utilizing vacuum arc remelting for carbon deoxidation, the Charpy impact values of which are shown at B. The improvement in toughness for steel produced according to the invention is at once apparent.

Figure 13:
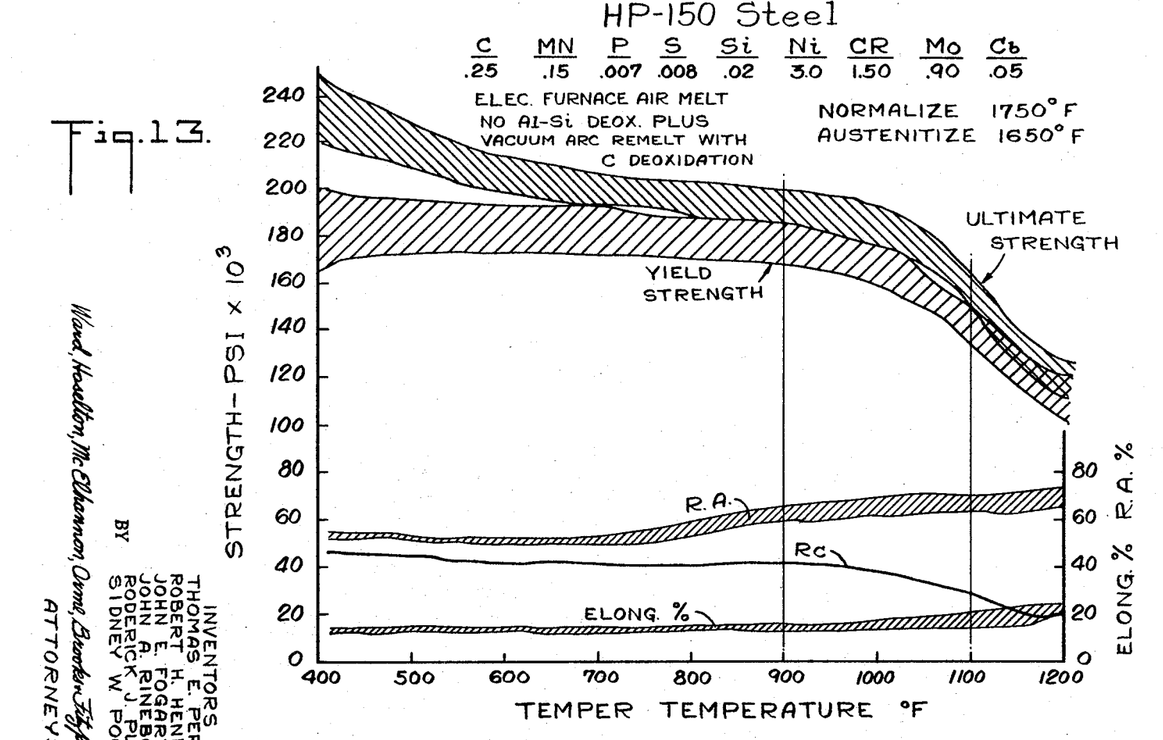
FIG. 13 is a graphical showing of the mechanical properties of HP-150 steel versus tempering temperature as produced in accordance with this invention and thereafter austenitized, quenched and tempered at the temperatures indicated.

The mechanical properties of HP-150 steel as produced in accordance with this invention are shown in FIG. 13 versus tempering temperatures. The composition of the steel as thus produced is also set forth, wherein it will be seen that the silicon content is substantially nil and that of manganese extremely low, i.e., 0.15%. A small amount of Cb has been added as a grain size control. As compared to this, for the steel as conventionally produced, Mn is about 0.6%, Si about 0.3% and Al used as a deoxidizer about 0.03%.

Figure 14:
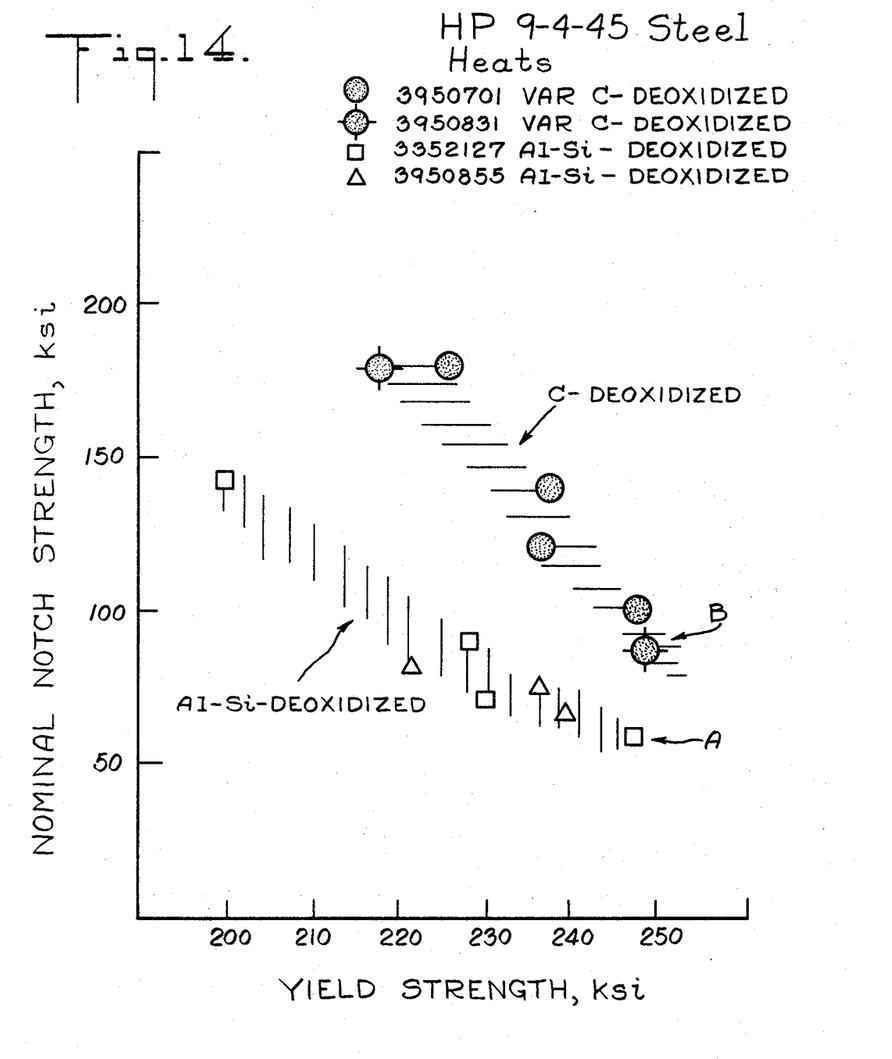
FIG. 14 is a graphical showing of the relation between nominal notch strength and yield strength of HP 9-4-45 steel as conventionally produced and as produced in accordance with this invention as described below.

One of the more recently developed high strength steels is HP 9-4-45 consisting essentially of 9% Ni, 4% Co and 0.45% C. The annexed FIG. 14 gives comparative test results on nominal notch strength versus yield strength for this steel as conventionally produced by air melting, aluminum-silicon deoxidized and vacuum arc remelting, as compared to its production according to this invention by air melting, oxygen treating and carbon deoxidation under vacuum. The test results on this steel as conventionally produced are shown at A and those in the steel as produced according to this invention are shown at B. The superior toughness of the latter as compared to the former at all yield strength levels is clearly apparent from the data.

of the present invention to the production particularly of martensitic steels, results in overall improvement in properties.

With respect to alloying and alloy effects: silicon is no longer required for steel deoxidation. Its true role with respect to this invention, is that of a solid solution strengthener. In solid solution, it appears to reduce toughness especially at higher strength levels. By holding silicon to low levers it is often possible, as shown above, to design alloys with higher carbon and thereby improve strength with little or no loss in toughness.

Manganese is a cheap alloying element where hardenability is the objective. It is no longer required for deoxidation with this invention. Its solid solution effect on toughness is not yet clear in medium and higher carbon martensitic temper alloys. The reduction of Mn in steels as produced hereunder has a marked effect in reducing or eliminating sulfide stringers in the microstructure. This is a major tool in improving transverse properties.

Reduction in the overall level of oxygen and nitrogen in steel by vacuum deoxidation in accordance with this invention is an important factor in cleaning up the oxide type dirt in the microstructure. The result is the reduction of internal notches and reduction of directionality. Less freezing segregation is a further advantage. It appears that reduction of oxygen and nitrogen exerts a favorable effect on the ability of the steel matrix to redistribute stresses around sharp notch defects.

High vacuum ladle degassing combined with carbon deoxidation according to this invention, will produce a consistently high quality steel with good reproducibility, although carbon deoxidation during vacuum arc remelting appears to be the optimum practice where lowest gas levels are desired.

The following are given as specific examples of the production of high purity steels in accordance with this invention:

Example I

A charge of 385 lbs. of scrap steel low in phosphorus and sulfur plus 11 lbs. 8 ozs. of nickel and 3 lbs. of ferro molybdenum together with 2 lbs. of Carbo "90" as carbon is added to an electric arc furance of standard commercial design. This is covered with a layer of 20 lbs. of lime, and 8 lbs. of spar to serve as slag covering. This charge is melted by applying 120–140 volts and 1500–1800 amps. for 70 to 90 minutes. The molten metal is then blown with pure oxygen to remove phosphorus, sulfur and manganese to within preselected upper limits as above mentioned and also substantially to eliminate any metallic elements present in the charge having an affinity for oxygen higher than or substantially equal to that of carbon, such as Zr, Al, Ti, and Si as shown in Table I, supra. The resultant slag is run off and replaced with a finishing slag comprising 20 lbs. of lime, and 8 lbs. of spar, 4 lbs. silica sand plus 3 lbs. coke fines. At this time a sample of the melt is removed for analysis to determine whether elements need to be added to obtain the ultimate desired specification. In this case, the chemical analysis shows the following percentages:

|  | C | Mn | P | S | Si | Ni | Cr | Mo | Cu |
|---|---|---|---|---|---|---|---|---|---|
| 1st Prelim | .16 | .14 | .008 | .015 | .03 | 2.95 | .05 | .48 | .04 |
| Spec. Aim | .13–.19 | Nil | [1].010 | [1].010 | Nil | 2.80–3.10 | 1.50–1.70 | .45–.55 |  |

[1] Max.

Additions of 9 lbs. Fe-Cr and .13 lb. Fe-Mo are made to give the desired aims. The melt as thus prepared may now either be subjected to ladle degasification in the manner above described with reference to FIGS. 5 to 13, inc. of the drawings. Alternatively the melt may be tapped into an open ingot of such dimensions as to form an ingot of such dimensions as to give an ingot of 7" RC sq. x 24" long x 350 lbs. This ingot is forged to a 5½" rd. x 45" long electrode, the skin ground off, and the ingot prepared for remelting as an electrode in a consumable electrode vacuum furnace.

The resultant electrode is placed in a vacuum consumable electrode furnace of commercial design and the atmosphere is exhausted to a reduced pressure of 1–2 microns. Then the electrode is melted by the application of 24–26 volts and 3800–4400 amperes for 120 minutes while maintaining a reduced pressure of 2 microns of mercury and collecting the melt in the copper crucible of the furnace.

Example II

A charge of 350 lbs. of scrap steel low in phosphorus and sulfur plus 36 lbs. of nickel, 16½ lbs. of cobalt, 1 lb. 8 ozs. of ferro molybdenum together with 3 lbs. of Carbo "90" as carbon is added to an electric arc furnace of standard commercial design. This is covered with a layer of 20 lbs. of lime, and 8 lbs. of spar to serve as slag covering. This charge is melted by applying 120–140 volts and 1500–1800 amps. for 70–90 minutes. Then the molten metal is then blown with pure oxygen as explained in Example I. The resultant slag is run off and replaced with a finishing slag comprising 20 lbs. of lime, and 8 lbs. of spar, 4 lbs. silica sand plus 3 lbs. coke fines. At this time a sample of the melt is removed for analysis to determine whether elements need to be added to obtain the ultimate desired specification. In this case, the chemical analysis shows the following percentages:

Example III

A charge of 144,000 pounds of scrap steel low in phosphorus and sulfur plus 15,000 lbs. of nickel and 6300 lbs. of cobalt plus 1200 lbs. molybdenum oxide together with 2400 lbs. of carbon in the form of ground electrodes is added to an electric furnace of standard commercial design. This is covered with a layer of 3000 lbs. of lime and 1500 lbs. of spar which serves as a slag covering. This charge is melted by applying approximately 360 to 380 volts and 10,000 amps which amounts to 62,000 kw. hrs. for the whole heat. Then the molten metal is then blown with pure oxygen as explained in Example I. The resulting slag is run off and replaced with a finishing slag comprising 3000 lbs. of lime, 1500 lbs. of spar and 500 lbs. of coke fines and 100 lbs. of sand. At this time a sample of the melt is removed for analysis to determine whether elements need to be added to obtain the ultimate desired specification. In this case, the chemical analysis shows the following percentages:

|  | C | Mn | P | S | Si | Ni | Cr | Mo | Co | Va |
|---|---|---|---|---|---|---|---|---|---|---|
| 1st Prelim | .366 | .15 | .009 | .008 | .02 | 7.70 | .16 | .28 | 3.14 | .00 |
| Specification | .42–.44 | [1].15 | [1].010 | [1].007 | [1].10 | 8.75–9.25 | .25–.35 | .30–.35 | 3–50–4.00 | .08–.12 |

[1] Max.

Final additions to give the desired aims are 2475 lbs. of nickel, 1240 lbs. cobalt, 145 lbs. ferro-molybdenum, 400 lbs. of ferro-chromium, 175 lbs. of vanadium plus 204 lbs. of carbon. Then the melt is tapped into open ingots of such dimensions as to give ingots of 24" diameter and approximately 165" long x 20,000 lbs. These ingots are then used as the electrodes for consumable vacuum melting using amperages between 5,000 and 30,000 amps. at 20–25 volts at a reduced pressure of less than 3 microns for a sufficient time in each case to complete the melt. The oxygen content of the product in each case is in the range of 1–4 parts per million.

As above mentioned the present invention is particularly adapted to the production of high purity martensitic steels and more especially the low alloy steels of this type containing not over about 6% of total alloy content with carbon ranging from about 0.05% minimum and to about 1.20%. Such steels as produced according to this invention will contain under 0.25% manganese, preferably about 0.15–0.25%, the upper limit applying to low carbon contents and vice-versa, with silicon under 0.25%, preferably 0.15% and generally under 0.05%. The oxygen content is low compared to conventionally produced steels, but is related to the carbon content and generally does not exceed about 15 p.p.m. Hydrogen does not exceed about 2 p.p.m. and nitrogen does not exceed about 50 p.p.m. The steels are also substantially free from solid metallic oxides or other solid contaminating inclusions.

The advantages of the present invention in the production of steels having improved mechanical properties are due to the following factors:

(1) The very low oxygen levels which result and which

|  | C | Mn | P | S | Si | Ni | Cr | Mo | Co | Va |
|---|---|---|---|---|---|---|---|---|---|---|
| 1st Prelim | .33 | .16 | .006 |  | .02 | 8.75 | .04 | .27 | 3.90 |  |
| 2nd Prelim [1] | .45 | .13 | .006 | .012 | .02 | 9.05 | .04 | .32 | 4.00 |  |
| Specification | .44–.46 | Nil | [2].010 | [2].010 | Nil | 8.00–10.00 | .25–.35 | .30–.35 | 3.75–4.10 | .08–.12 |

[1] After refining slag is put on.  [2] Max.

Final additions to give the desired aims are 1 lb. 12 ozs. Fe-Cr and 12 ozs. Fe-Va. The melt as thus prepared is now subjected to vacuum degasification in either of the ways above mentioned in Example I.

are more easily obtainable than otherwise by using carbon deoxidation in the absence of reactive alloys, is beneficial to the cleanliness of the steel and as a result to various properties including relative anisotropy and toughness.

(2) The combination of vacuum degassing together with violent carbon monoxide boiling during the carbon deoxidation results in much lower nitrogen levels than by conventional techniques. The low nitrogen level appears to be effective combined with other factors in improving toughness.

(3) The process of carbon deoxidation permits the production of high grade steels without the use of silicon for dexodiation. Silicon in solid solution contributes adversely to toughness.

(4) One effect of low oxygen and freedom from oxide-type inclusions is greater concentration of sulfides in the microstructure. A drastic reduction of Mn, such as is obtained with this invention, substantially reduces these sulfides thus producing very clean, non-directional steels.

(5) The combined effects of these several factors have a pronounced influence on the mechanical properties of steel.

What is claimed is:

1. The method of producing a high purity steel substantially free from solid contaminating inclusions and having low levels of gaseous constituents, which comprises: melting at atmospheric pressure, a charge consisting principally of iron and any alloying additions required in the final analysis which have a substantially lesser affinity for oxygen than does carbon, oxygenating said molten charge to reduce phosphorus, sulfur and manganese within preselected upper limits, and to reduce any metallic elements present which have an affinity for oxygen higher than or substantially equal to that of carbon, adjusting the carbon content of the molten bath to a value sufficiently in excess of that required in the final analysis, to combine with the oxygen present in said molten bath, carbon deoxidizing the molten metal by subjecting to vacuum degasification until the vacuum is reduced to about 100 microns (Hg), thereupon adding to the molten bath while still under said vacuum, any metallic elements required in the final analysis which have an affinity for oxygen higher than or substantially equal to that of carbon, thereupon casting the molten metal into ingots, and electric arc remelting said ingots as consumable electrodes under vacuum of about 10 microns and into a liquid-cooled metal crucible.

2. The method of claim 1 wherein during said melting at atmospheric pressure, said oxygenating, and said carbon dioxidizing, there is withheld from said charge the elements Zr, Al, Ti and Si.

3. The method of claim 1 wherein there is added to said bath following said oxygenating, and while still under said vacuum, elements chosen from the group consisting of Zr, Al, Ti, Si, Cr, and V.

4. The method of claim 1 wherein said bath is maintained in a ladle lined with a highly stable refractory consisting of at least 70% alumina and the balance essentially silica.

5. The method of claim 1 wherein there is added to said charge prior to said oxygenating, alloying elements selected from the group consisting of Mn, Cb, Mo, and Ni.

6. The method of claim 1 wherein during said oxygenating, said charge is stirred by magnetic fields applied through the walls of a non-magnetic ladle containing said charge.

References Cited

UNITED STATES PATENTS

| | | | |
|---|---|---|---|
| 2,624,671 | 1/1953 | Binder et al. | 75—49 |
| 2,776,204 | 1/1957 | Moore | 75—49 |
| 2,815,273 | 12/1957 | Moore | 75—49 |
| 3,071,458 | 1/1963 | Finkl | 75—49 |
| 3,201,224 | 8/1965 | Grim | 75—49 X |
| 3,235,373 | 2/1966 | Poole et al. | 75—49 X |
| 3,236,636 | 2/1966 | Finkl | 75—49 |
| 3,010,823 | 11/1961 | Avery et al. | 75—123 |
| 3,060,015 | 10/1962 | Spolders et al. | 75—49 |
| 3,145,096 | 8/1964 | Finkl | 75—49 |
| 3,181,945 | 5/1965 | Elsea | 75—123 |
| 3,235,243 | 2/1966 | Taylor | 75—49 X |
| 3,239,204 | 3/1966 | Hokanson | 75—49 X |
| 3,240,588 | 3/1966 | Finkl | 75—49 |

OTHER REFERENCES

Byrne, "World's Largest Vacuum Induction Furnace," in Metal Progress, April 1960, pages 83–86.

Child et al., "Vacuum Melting of Steels," in Blast Furnace and Steel Plant, March 1959, pages 281–290.

Darmara et al., "Vacuum Induction Melting," in Journal of the Iron and Steel Institute, March 1959, pages 266–275.

Bunshah, "Vacuum Metallurgy," Reinhold Publishing, Corp. New York, 1958, pages 47 and 69.

DAVID L. RECK, *Primary Examiner.*

H. W. TARRING, *Assistant Examiner.*